July 14, 1964     O. C. BARNETT     3,140,651
CHARCOAL COOKER
Filed Nov. 14, 1962     2 Sheets-Sheet 1
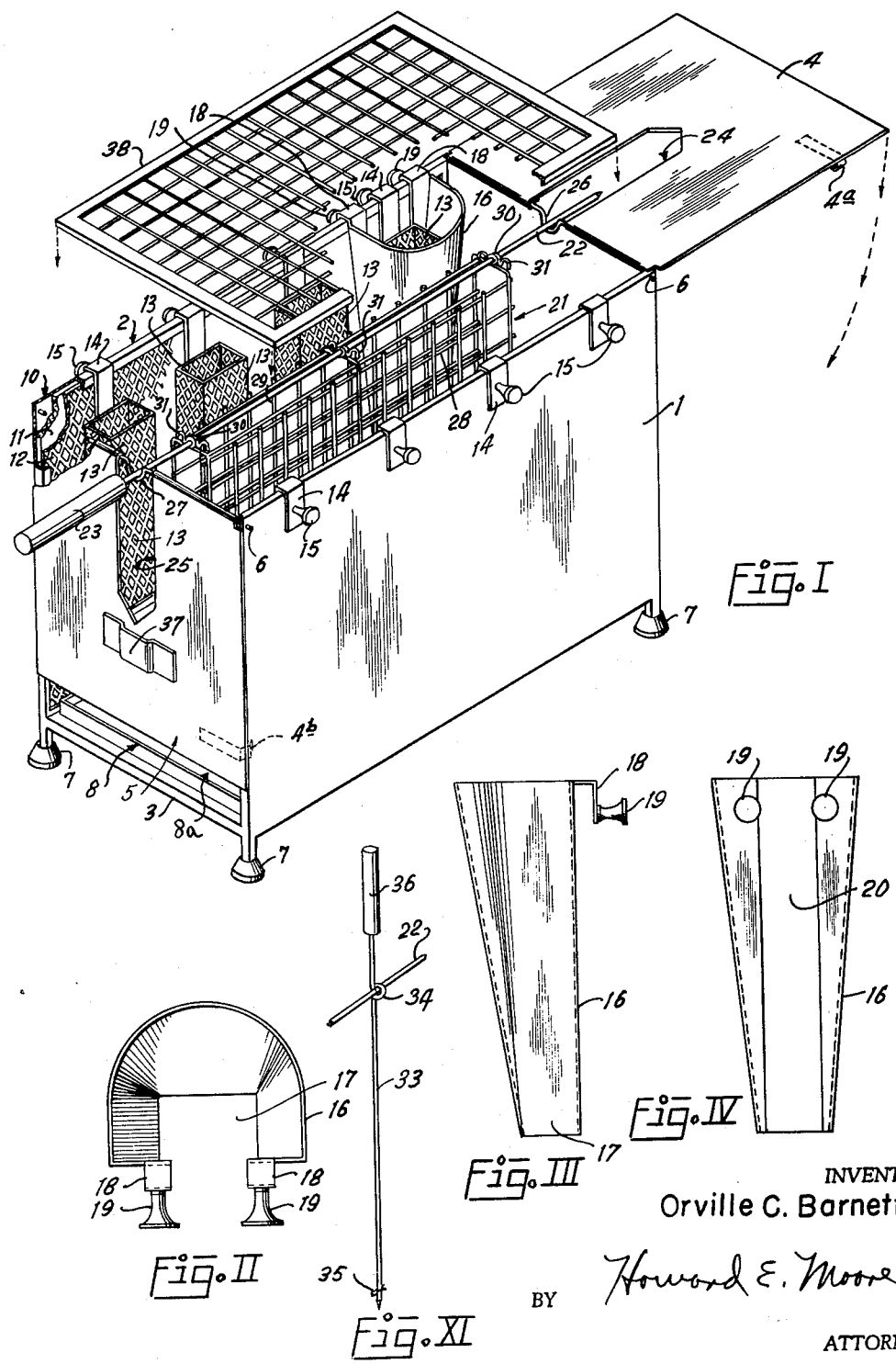
INVENTOR
Orville C. Barnett
BY Howard E. Moore
ATTORNEY July 14, 1964 O. C. BARNETT 3,140,651
CHARCOAL COOKER
Filed Nov. 14, 1962 2 Sheets-Sheet 2
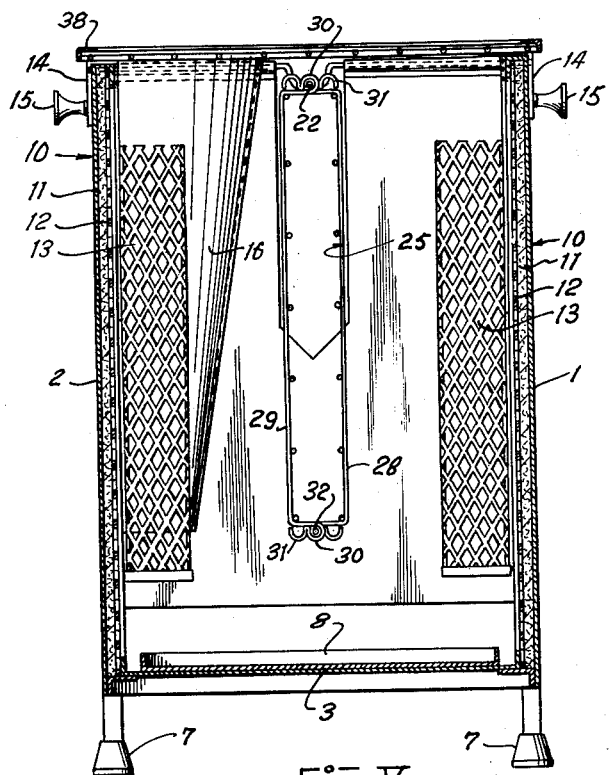
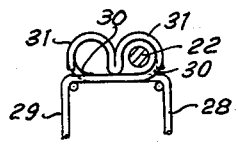
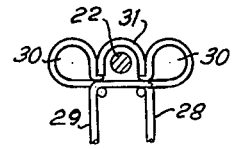
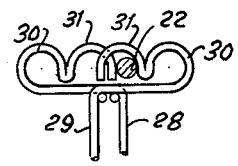
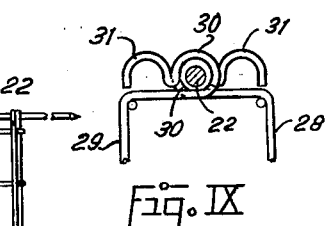
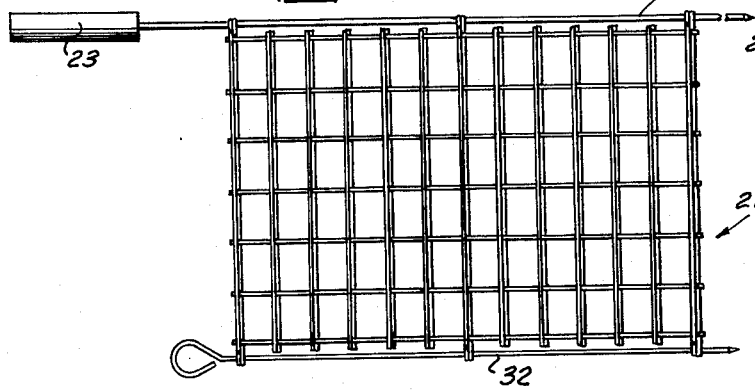
INVENTOR
Orville C. Barnett
BY Howard E. Moore
ATTORNEY «United States Patent Office»

3,140,651
Patented July 14, 1964

3,140,651
CHARCOAL COOKER
Orville C. Barnett, 552 Edgelake, Dallas, Tex.
Filed Nov. 14, 1962, Ser. No. 237,652
4 Claims. (Cl. 99—339)

This invention is concerned with a charcoal cooker apparatus, and is particularly concerned with a charcoal cooker wherein the food carrying grill is suspended in vertical position between foraminous charcoal containers which may be adjustably positioned on each side thereof, whereby the drippings from the meat or other food will not drip upon the live coals to cause unsavory odors or taste, which may be easily cleaned and maintained, and has other advantageous features hereinafter described.

It is a primary object of the invention to provide a charcoal grill apparatus wherein the grill is suspended in vertical position between charcoal baskets suspended to the sides of the housing therefor, wherein the charcoal baskets may be adjustably positioned with relationship to the grill and the number of baskets desired may be quickly and easily disposed with relation to the grill to provide the necessary heat required for the particular cooking operation.

A further object of the invention is to provide a charcoal grill assembly having an adjustable grill which may be adjusted in four positions of width, to hold and suspend different thicknesses of meat to be grilled in vertical position between the burning charcoal.

Still another object of the invention is to provide a charcoal grill assembly wherein the juices from the meat being grilled do not fall upon the burning embers to cause unsavory odor and taste.

A still further object of the invention is to provide a barbecue grill assembly wherein there is provided foraminous charcoal container baskets which may be suspended to the side of the container adjacent the grill, which are easily handled, and the required number of such baskets may be added or taken away to provide the necessary grilling heat desired.

Still another object of the invention is to provide a water heating attachment arranged to be suspended to the side of the charcoal cooker housing wherein one of the foraminous baskets may be placed for heating water or stewing vegetables or the like.

Still another object of the invention is to provide a charcoal grill assembly of the type hereinbefore indicated, having pivoted end closures which may be swung to upward position for cleaning, or may provide the function of tables.

A general object of the invention is to provide a charcoal grill assembly which is compact, is simple and easy to use, inexpensive to manufacture, easy to clean and maintain, provides maximum convenience and ease in outdoor cooking and cooks meat of superior quality and flavor.

A suitable embodiment of the invention is shown in the attached drawings wherein:

FIGURE I is a perspective view partially cut away of the charcoal grill assembly incorporating the improvements comprehended by this invention;

FIGURE II is a top plan view of the water heater shell to be suspended to the side of the housing of the grill;

FIGURE III is a side elevational view of the water heater shell;

FIGURE IV is a rear view of the water heater shell;

FIGURE V is a transverse, cross-sectional elevational view of the barbecue grill assembly;

FIGURE VI is an end view showing one position of adjustment of the grill width;

FIGURE VII is an end view showing another position of adjustment of the width of the grill;

FIGURE VIII is an end view showing still another position of adjustment of width of the grill;

FIGURE IX is an end view of still another position of adjustment of the width of the grill;

FIGURE X is a side elevational view of the adjustable grill; and

FIGURE XI is a perspective view of the shish-kabob spit which may be used with the barbecue device.

Numeral references are employed to designate the various parts shown in the drawings, and like numerals indicate like parts throughout the various figures of the drawings.

The numerals 1 and 2 indicate the side walls of the housing for the barbecue grill assembly which also includes a bottom 3, and end covers 4 and 5 which are pivoted on pivot rods 6, rotatably extending through the opposite walls of the housing at each end.

The end doors, or covers 4 and 5, may be latched in downward position by spring latches 4a and 4b, which are sprung into engagement with the walls 1 and 2 of the housing when the end covers are lowered.

The end covers 4 and 5 may be raised for the purpose of cleaning the inner side of the housing, or they may be propped up in horizontal position, as shown in FIGURE I to serve as tables.

The housing is mounted on suitable legs 7, or it could be mounted on casters, as desired. However, the device is so light and compact that it may be easily picked up and carried and may be made so compact as to be placed in an ordinary fireplace inside the house, or set on a table or other object inside or outside the house for use and may be easily stowed in the trunk of an automobile. However, the compactness thereof does not detract from the utility and capacity of the device to cook enough meat to serve up to ten persons.

A drip pan 8 may be slidably positioned on the floor 3 inside the housing underneath the grill to catch any drippings from meat cooking in the grill, and may be placed within, and withdrawn from the housing through a space 8a left between the bottom of the end door 5 and the floor 3.

The side walls 1 and 2 include an outer metal sheet 10, with a layer of insulating material, such as asbestos 11, disposed therebetween and the inner lining 12, which may be made of expanded metal to allow better displacement of heat.

A plurality of charcoal baskets 13 are made of foraminous material, such as expanded metal, each basket having a hook 14 attached to the upper, inner side thereof, said hooks being arranged to be suspended over the sides 1 and 2 of the housing.

Each hook 14 has a knob 15 extending outwardly from the outer side thereof, which knob is made of insulating material, so that the baskets may be handled while filled with burning charcoal without burning the hands.

It will be noted that the charcoal baskets 13 may be adjusted and positioned as desired along the walls 1 and 2, and are so constructed that the number of baskets, as may be selected to perform the desired cooking operation, may be suspended on the walls, either on both sides, or one side of the grill 21, containing the meat or other food to be cooked.

The unlighted charcoal may be placed in the baskets, and the baskets placed on a pan or other receptacle, such as the pan 8, and charcoal lighter fluid placed thereon and lit to cause the charcoal to become ignited. The baskets 13 are so placed on the pan or other receptacle, that the handles 15 are not exposed directly to the heat, so that when the charcoal embers are burning properly, the individual baskets may be picked up by the knobs 15 without burning the hands and suspended to the sides of the housing 1 and 2. After being so suspended, briquets or particles of charcoal may be added to the burning embers as desired to maintain and control the vertical heat.

A water heating or stewing shell 16 is provided which is generally funnel shaped and has an open lower end 17 and open inner side 20. Suspending hooks 18 are provided on the shell 16, each hook having an insulator handling knob 19 thereon.

As shown in FIGURE I, the funnel shaped heating and stewing shell may be suspended to the side of the housing, and a charcoal basket 13, having live coals therein, may be suspended therein. Then a stewer or coffee pot may be placed over the shell 16 to heat water or cook vegetables or stew as may be desired, either with the foraminous top cover 38 thereover, or without same thereover.

The grill 21 employed with the charcoal cooker assembly comprises mesh sides 28 and 29, preferably made up of stiff steel rods formed in spaced right angular relationship. The grill 21 may be suspended in vertical position as shown in FIGURE I on a spit 22 in the manner hereinafter described. The spit 22 has an insulated handle 23 thereon to permit handling of the grill without burning the hands. A removable handle may be provided like that shown at 23 which can be attached to the other end of the spit 22 to permit ease of handling.

The spit 22 is suspended in downwardly directed loops 26 and 27 formed substantially centrally of the pivot rods 6, so that it may be easily suspended thereon and removed therefrom.

Elongated passages 24 and 25 are provided in the end covers 4 and 5 to provide space to receive the extended ends of the spit 22 when the end doors 4 and 5 are raised while the grill is suspended in the housing.

The sides 28 and 29 of the grill are preferably formed by a mesh of stiff steel rod material, the end rods on each said grill side being shaped and formed at their outer ends and at the middle so as to provide a right angular extension thereon which is doubled back and shaped to form laterally extending loops 30 and 31, which in conjunction with the spit 22 and the connector pin 32 provides for adjustable connection between the sides 28 and 29, and also provides for quick and easy adjustment of the spacing between the grill sides 28 and 29 to adjust same for different thicknesses of meat which may be placed therebetween, as hereinafter described.

As shown in FIGURES VI–IX, four different positions of spacing between the grills 28 and 29 are provided, and after being spaced, the spit 22 and retaining pin 32 are inserted through aligned loops 30 and 31, or through a loop 30 and against the end of another loop 31, as in FIGURE VIII, to retain the grill sides 28 and 29 in adjusted position.

In assembling the grill 21 with the meat to be cooked, the meat is laid upon one of the sides 28 or 29, which may be steaks, halves or pieces of chickens, lamb chops, pork chops, or the like. The other grill 28 or 29 is laid thereover, and is pressed downwardly to bring loops 30 and 31 on opposite ends of grill sides 28 and 29 into alignment, and the spit 22 and the retaining pin 32 are inserted therethrough to retain same in assembled position with the meat therebetween. Preferably a slight pressure should be exerted against the meat in assembled position so that it will remain in position between the grill sides 28 and 29 while it is cooking in suspended vertical position.

The adjusted position shown in FIGURE IX is the widest adjustment, the position shown in FIGURE VI is the next widest, the position shown in FIGURE VII is the next widest, and the position shown in FIGURE VIII is the narrowest adjustment.

After clamping the meat between the grill sides 28 and 29, the grill may be suspended in vertical position in the housing as shown in FIGURE I, in position so that the heat emanating from burning charcoal in the baskets 13, suspended to the sides of the housing, will grill and cook the meat. Of course, other kinds of food could be cooked between the grills, such as vegetables wrapped in foil or otherwise suitably packaged.

Shish-kabob, consisting of pieces of meat and vegetables interspersed and impaled on a spit 33, may be easily cooked on this device by use of the spit shown in FIGURE XI, and generally indicated by the numeral 33. Said spit 33 has an insulated handle 36 thereon, and a loop 34 provided intermediate the ends thereof. The particles of meat and vegetables may be impaled on the spit 33 and held thereon by the hairpin-like retainer member 35 sprung thereabout. The spit 22 may be passed through the loop 34 in the shish-kabob spit 33 as shown in FIGURE XI, and spit 22 suspended in the housing in the manner shown in FIGURE I. The weight of the impaled food on the spit 33 will cause the pointed end of the spit to be directed downwardly between the charcoal baskets 13, to cook the shish-kabob.

A motor driven spit could be mounted on the housing by inserting the mounting bracket thereof in the holder 37 provided on the outer face of the end cover 5.

The grill 21 can be removed from spit 22, and a whole turkey, chicken, ham or roast can be impaled on spit 22 and suspended to the ends of the housing so that it can be cooked and turned either manually or by a motor as it cooks.

A removable top cover or grill 38 may be provided, which may overlay the sides of the housing. The cover 38 is made of heavy mesh material, to support vegetables, cooking vessels, and so forth thereon, for cooking same while the meat is being grilled.

It may also be used for cooking or warming of bread, and keeping food warm after it has been cooked.

After the meat has been cooked between the grill walls 28 and 29, it may be removed and laid on its side on the cover 38, the tie rods 22 and 32 removed, the top grill section 28 or 29 removed therefrom, where it may be kept warm until served.

It will thus be seen that I have provided a charcoal grill assembly which is compact, simple and easy to use, easy to clean, wherein the grill is suspended vertically and the charcoal containers are suspended on one or either side thereof whereby the drippings from meat or other food being cooked on the grill, does not come in contact with the coals but drops into a receptacle which may be easily removed and cleaned; wherein the charcoal containing baskets may be adjusted longitudinally of the housing, and the number of baskets and the amount of live charcoal may be easily regulated to provide the heat required for the particular cooking operation; which has an adjustable grill, adjustable to different thicknesses of meat placed therebetween; which has end closures thereon which provides easy access thereto and may be employed as auxiliary tables; which has means provided therewith for concentrating heat from burning charcoal to boil water or stew vegetables, etc., and provides for cooking meat and other food of superior quality and flavor.

It will be understood that other and further embodiments of the invention may be devised without departing from the spirit and scope of the appended claims.

Having described my invention, I claim:

1. In a vertical grill type of charcoal cooker;
   a housing including
      side walls,
      end walls,
      a bottom,
      a removal drip pan disposed on the bottom;
   suspension rods pivotally attached between the upper ends of the side walls;
   an end wall attached to each suspension rod,
      said end walls being free of attachment at their lower ends whereby they way be raised to horizontal position to cause same to extend outwardly of the side walls;
aligned vertical slots in the upper edges of the end walls;
downwardly directed aligned loops formed in the rods within each slot;
a vertically disposed grill including
separable foraminous sides,
a plurality of loops extending substantially right angularly outwardly from each corner of the grill sides,
said loops being arranged to overlap in coinciding relationship when placed in juxtaposed position;
a rod-like member removably extending through aligned overlapping loops at the upper edge of the grill with the ends thereof extending beyond the ends of the grill
and suspended in the loops in the rods;
a rod-like member removably positioned in overlapping loops on the lower edge of the grill;
a plurality of charcoal baskets having foraminous walls;
a hook attached to the upper edge of each basket slidably suspended over the upper edges of the side walls;
an insulator member attached to each hook on the outer sides thereof
whereby a plurality of said baskets may be suspended to each side wall inside the housing, with the insulator member accessible from the outer side of the side walls.

2. In a vertical grill type of charcoal cooker;
a housing including
side walls,
end walls,
a bottom,
a removal drip pan disposed on the bottom;
suspension rods pivotally attached between the upper ends of the side walls;
an end wall attached to each suspension rod,
said end walls being free of attachment at their lower ends
whereby they may be raised to horizontal position to cause same to extend outwardly of the side walls;
aligned vertical slots in the upper edges of the end walls;
downwardly directed aligned loops formed in the rods within each slot;
a vertically disposed grill including
separable foraminous sides,
a plurality of loops extending substantially right angularly outwardly from each corner of the grill sides,
said loops being arranged to overlap in coinciding relationship when placed in juxtaposed position;
a rod-like member removably extending through aligned overlapping loops at the upper edge of the grill with the ends thereof extending beyond the ends of the grill and suspended in the loops in the rods;
a rod-like member removably positioned in overlapping loops on the lower edge of the grill; a plurality of charcoal baskets having foraminous walls; and
a hook attached to the upper edge of each basket slidably suspended over the upper edges of the side walls.

3. The combination called for in claim 2 with the addition of
a removable foraminous cover arranged to rest upon the upper edges of the housing.

4. The combination called for in claim 2 with the addition of
a hollow shell open at the upper and lower ends thereof
having hooks thereon at the upper edge thereof engageable over the upper edge of one of the side walls of the housing;
and a charcoal basket having a hook attached to the upper edge thereof engaged with the upper edge of the side wall of the housing,
and suspended within the shell.

References Cited in the file of this patent
UNITED STATES PATENTS

| | | |
|---|---|---|
| Re. 4,619 | Lee | Oct. 31, 1871 |
| 2,066,507 | Yost | Jan. 5, 1937 |
| 2,474,043 | Etches | June 21, 1949 |
| 2,690,171 | Riedy | Sept. 28, 1954 |
| 2,846,941 | Goodwin | Aug. 12, 1958 |
| 2,923,229 | Halford | Feb. 2, 1960 |
| 2,946,275 | Compton | July 26, 1960 |
| 2,975,698 | Miller | Mar. 21, 1961 |
| 3,018,771 | Curtis | Jan. 30, 1962 |
| 3,056,344 | Miller | Oct. 2, 1962 |